United States Patent
Stark et al.

(10) Patent No.: US 6,711,926 B2
(45) Date of Patent: Mar. 30, 2004

(54) METHOD OF MANUFACTURING A HOCKEY PUCK

(75) Inventors: Timothy W. Stark, 7405 Oak Ct., Horace, ND (US) 58047; Shane P. Tibiatowski, Fargo, ND (US)

(73) Assignee: Timothy W. Stark, Horace, ND (US)

( * ) Notice: Subject to any disclaimer, the term of this patent is extended or adjusted under 35 U.S.C. 154(b) by 42 days.

(21) Appl. No.: 10/013,006

(22) Filed: Nov. 5, 2001

(65) Prior Publication Data

US 2003/0084695 A1 May 8, 2003

(51) Int. Cl.⁷ .............................................. B21D 15/00
(52) U.S. Cl. .................................. 72/70; 72/108; 72/338
(58) Field of Search ............................... 72/70, 71, 91, 72/92, 108, 335, 336, 337, 338, 339; 473/588

(56) References Cited

U.S. PATENT DOCUMENTS

| | | | |
|---|---|---|---|
| 3,726,526 A | * 4/1973 | Radovich | 473/588 |
| 3,797,057 A | * 3/1974 | Smeldon | 273/126 R |
| 3,844,155 A | * 10/1974 | Bew et al. | 72/356 |
| 3,887,188 A | * 6/1975 | Beauchamp et al. | 273/126 R |
| 4,084,303 A | * 4/1978 | Skinner | 72/71 |
| 4,111,419 A | 9/1978 | Pellegrino | 273/1 B |
| 4,153,253 A | 5/1979 | White, Sr. | 273/128 |
| 4,491,320 A | * 1/1985 | Smith | 473/446 |
| 4,580,431 A | * 4/1986 | Oku et al. | 72/334 |
| 5,174,567 A | * 12/1992 | Nordstrom | 473/446 |
| 5,284,343 A | 2/1994 | Bigornia et al. | 273/128 |
| 5,518,237 A | 5/1996 | Bellehumeur | 273/128 |
| 5,597,161 A | 1/1997 | Bellehumeur et al. | 473/588 |
| 5,672,129 A | * 9/1997 | Fisher et al. | 473/471 |
| 5,733,213 A | 3/1998 | Colarusso | 473/588 |
| 5,976,042 A | * 11/1999 | LaMarche et al. | 473/588 |
| 6,244,089 B1 | * 6/2001 | Schoenau et al. | 72/108 |

* cited by examiner

*Primary Examiner*—Ed Tolan
(74) *Attorney, Agent, or Firm*—Neustel Law Office

(57) ABSTRACT

A method of manufacturing a hockey puck for enhancing a hockey player's skills, strength and endurance. The method of manufacturing a hockey puck includes the steps of severing a disk member off a solid metal shaft, rounding perimeter edges of the disk member, and pressing a gripping into an outer perimeter surface of the disk member. The metal shaft may be comprised of various types of metal such as but not limited to aluminum and steel. The disk member is preferably 2–5 times heavier than a conventional hockey puck depending upon the metal utilized. The disk member is preferably three inches in diameter in order to simulate the size of a conventional hockey puck, however the disk member may have diameters greater or less than three inches depending upon the type of training the hockey puck is to be utilized within.

19 Claims, 11 Drawing Sheets

METHOD OF MANUFACTURING A HOCKEY PUCK

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to hockey training devices and more specifically it relates to a method of manufacturing a hockey puck for enhancing a hockey player's skills, strength and endurance.

2. Description of the Prior Art

Hockey pucks have been in use for years. A conventional hockey puck is typically comprised of vulcanized rubber molded into a three (3) inch diameter disk structure weighing between five and one-half ounces (5½ oz.) to six ounces (6 oz.) and having a thickness of one (1) inch. A conventional hockey puck is utilized by players practicing their shooting, passing, guiding and stopping of the hockey puck. Hockey training devices exist that assist hockey players with the shooting and maneuvering of a hockey puck, however, they are typically relatively expensive, complex and susceptible to breakage.

The main problem with the usage of a conventional hockey puck during practice and training sessions is that the hockey player is unable to capitalize upon the well-known conditioning principle of specific adaptations to imposed demands (SAID). An hockey player practicing with a conventional hockey puck comprised of vulcanized rubber weighing between five and one-half ounces (5½ oz.) to six ounces (6 oz.) and having a diameter of three-inches will require additional time and practice to achieve improved skills.

While these devices may be suitable for the particular purpose to which they address, they are not as suitable for enhancing a hockey player's skills, strength and endurance. Conventional hockey training devices are relatively expensive, complex to utilize and are susceptible to breakage over extended usage thereof.

In these respects, the method of manufacturing a hockey puck according to the present invention substantially departs from the conventional concepts and designs of the prior art, and in so doing provides an apparatus primarily developed for the purpose of enhancing a hockey player's skills, strength and endurance.

SUMMARY OF THE INVENTION

In view of the foregoing disadvantages inherent in the known types of hockey training devices now present in the prior art, the present invention provides a new method of manufacturing a hockey puck construction wherein the same can be utilized for enhancing a hockey player's skills, strength and endurance.

The general purpose of the present invention, which will be described subsequently in greater detail, is to provide a new method of manufacturing a hockey puck that has many of the advantages of the hockey training devices mentioned heretofore and many novel features that result in a new method of manufacturing a hockey puck which is not anticipated, rendered obvious, suggested, or even implied by any of the prior art hockey training devices, either alone or in any combination thereof.

To attain this, the present invention generally comprises the steps of severing a disk member off a solid metal shaft, rounding perimeter edges of the disk member, and pressing a gripping into an outer perimeter surface of the disk member. The metal shaft may be comprised of various types of metal such as but not limited to aluminum and steel. The disk member is preferably 2–5 times heavier than a conventional hockey puck depending upon the metal utilized. The disk member is preferably three inches in diameter in order to simulate the size of a conventional hockey puck, however the disk member may have diameters greater or less than three inches depending upon the type of training the hockey puck is to be utilized within.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method of manufacturing a hockey puck that will overcome the shortcomings of the prior art devices.

A second object is to provide a method of manufacturing a hockey puck for enhancing a hockey player's skills, strength and endurance.

Another object is to provide a method of manufacturing a hockey puck wherein the hockey puck is comprised of a simple structure.

An additional object is to provide a method of manufacturing a hockey puck that provides a hockey puck with significant training advantages compared to conventional hockey pucks.

A further object is to provide a method of manufacturing a hockey puck that provides a hockey puck that increases a hockey athlete's conditioning, strength, power, endurance without the usage of expensive equipment.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
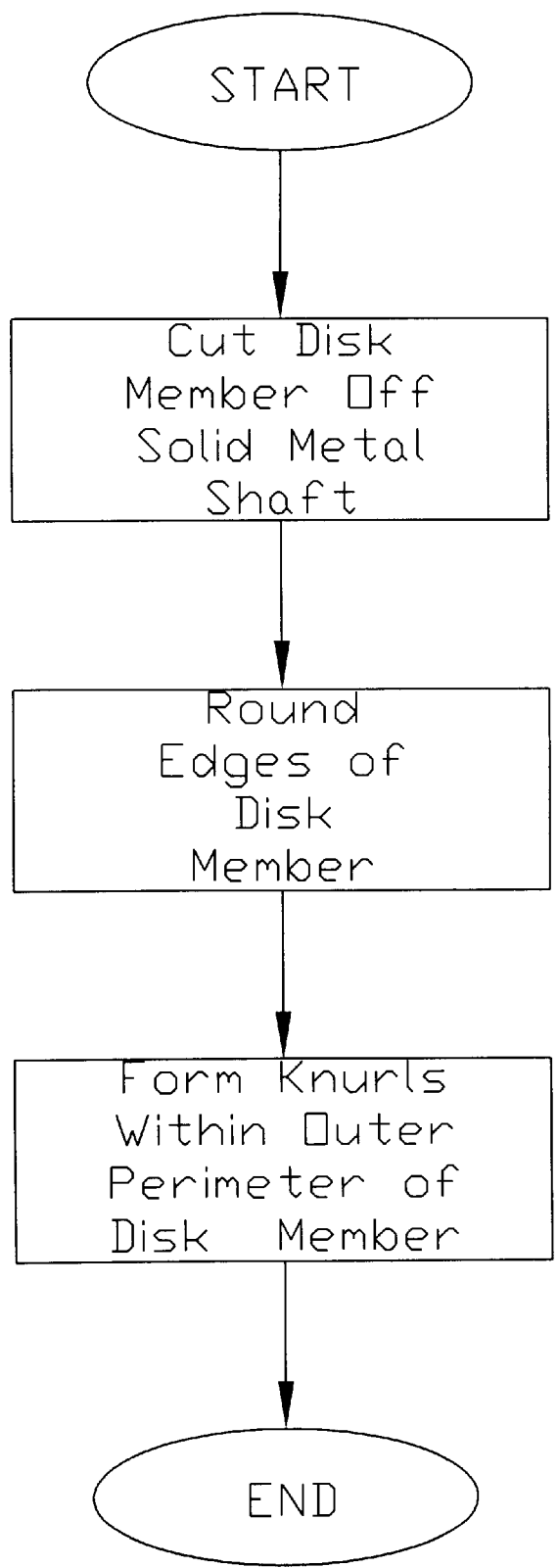
FIG. 1 is a flowchart illustrating the operation of the present invention.

Turning now descriptively to the drawings, in which similar reference characters denote similar elements throughout the several views, FIGS. 1 through 11 illustrate a method of manufacturing a hockey puck 10, which comprises the steps of severing a disk member 30 off a solid metal shaft 20, rounding perimeter edges of the disk member 30, and pressing a gripping into an outer perimeter surface 36 of the disk member 30. The metal shaft 20 may be comprised of various types of metal such as but not limited to aluminum and steel. The disk member 30 is preferably 2–5 times heavier than a conventional hockey puck depending upon the metal utilized. The disk member 30 is preferably three inches in diameter in order to simulate the size of a conventional hockey puck, however the disk member 30 may have diameters greater or less than three inches depending upon the type of training the hockey puck is to be utilized within.

Figure 2:
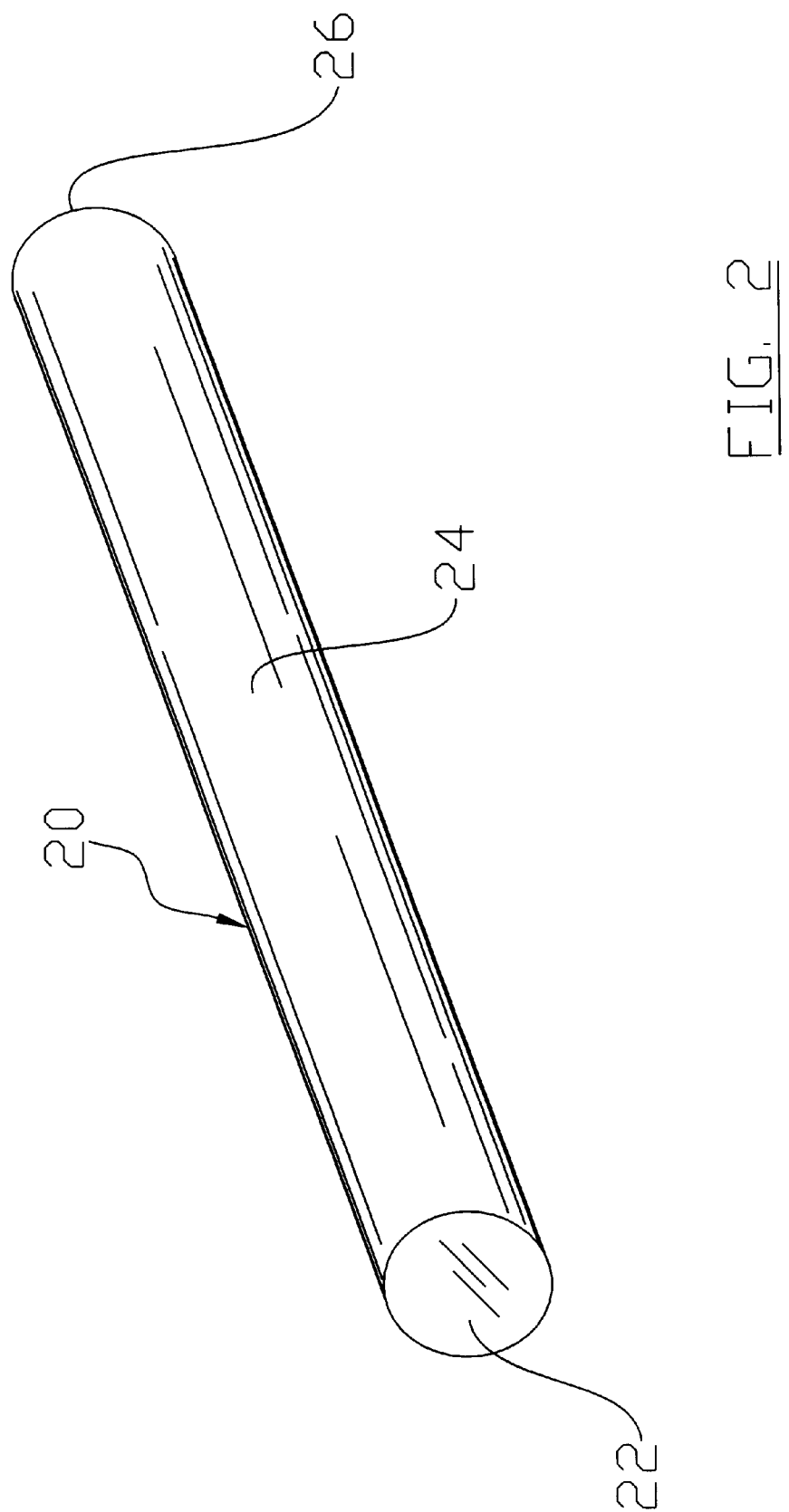
FIG. 2 is an upper perspective view of an elongate metal shaft.

As shown in FIG. 2 of the drawings, an elongate metal shaft 20 is provided. The elongate metal shaft 20 is comprised of a rigid and hard metal such as but not limited to aluminum, steel or stainless steel. It can be appreciated that the metal shaft 20 may be comprised of various compositions of metals in order to achieve various weights for the disk member 30.

Figure 3:
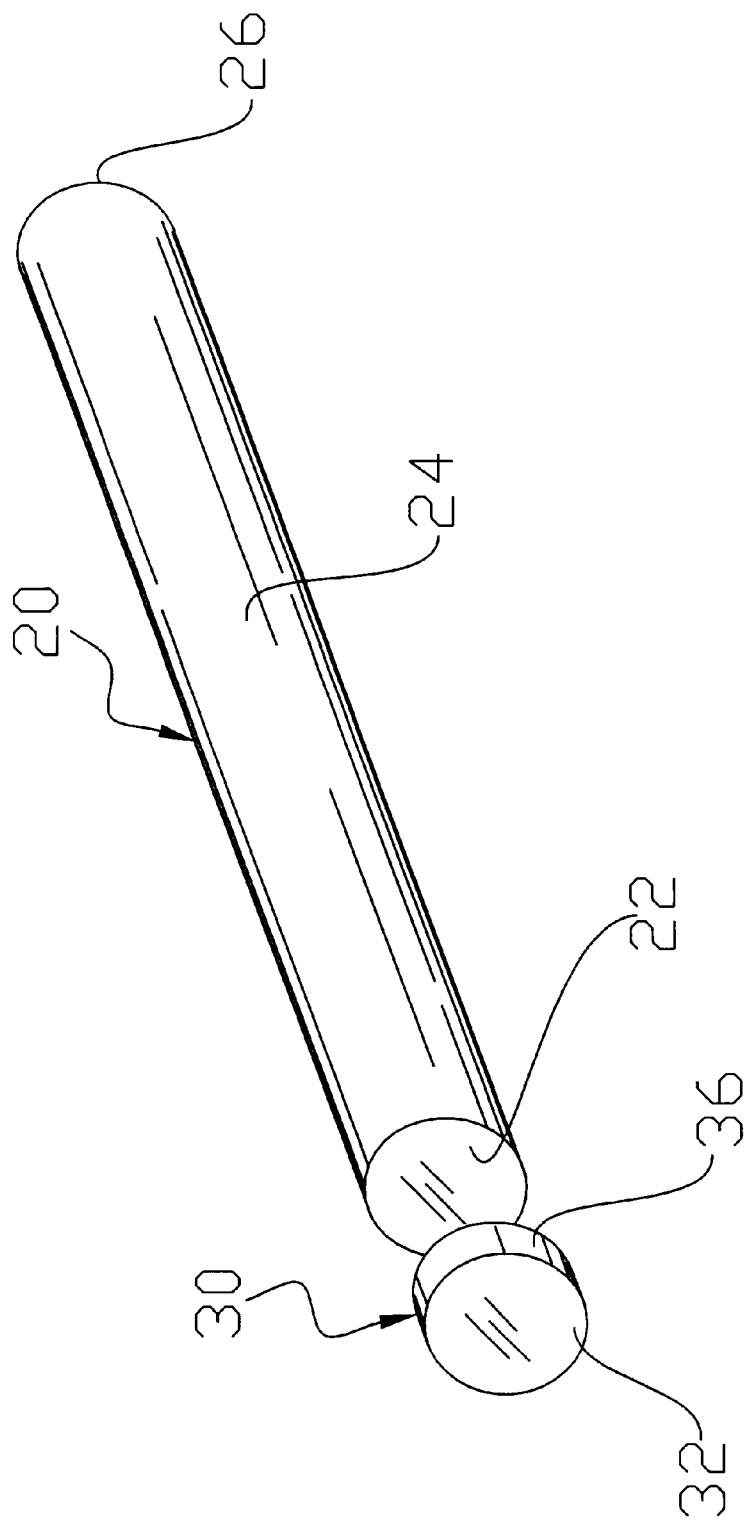
FIG. 3 is an upper perspective view of a puck member severed from the elongate metal shaft.

As shown in FIGS. 2 and 3 of the drawings, the elongate metal shaft 20 has a first end 22, a middle portion 24 and a second end 26 opposite of the first end 22. The elongate metal shaft 20 has a constant outer diameter approximately the outer diameter desired for the disk member 30 in final form. The outer diameter of the elongate metal shaft 20 may range between 2–4 inches in order to achieve various weights and handling characteristics. For example, if the usage of the disk member 30 is for increasing shooting and passing accuracy, a diameter smaller than 3 inches is desirable since the smaller the diameter is of the disk member 30 the more difficult it is for the individual to control thereby following the SAID principle. If the usage of the disk member 30 is mainly for endurance and strength training, a diameter of 3 or more inches is acceptable.

After the elongate metal shaft 20 is provided, the user then determines a location along the metal shaft 20 wherein to cut into thereby providing the desired thickness for the disk member 30. A disk member 30 preferably is comprised of a 1 inch thickness, therefore the user measures 1 inch from the first end 22 into the middle portion 24 of the metal shaft 20. However, a greater or lesser thickness may be utilized for the disk member 30 depending upon the desired usage thereof. For example, the thickness of the disk member 30 may be less than 1 inch if the main purpose of the disk member 30 is to assist in handling and shooting practice. Furthermore, the thickness of the disk member 30 may be adjusted proportionately to the diameter of the disk member 30. The disk member 30 may have various thicknesses between 0.5 to 1.5 inches.

After determining the desired cutting location, the user then severs the first end 22 of the disk member 30 utilizing a conventional cutting means such as but not limited to a saw or laser as shown in FIG. 3 of the drawings. Various other cutting apparatus may be utilized to cut through the elongate metal shaft 20 as can be appreciated.

Figure 4:
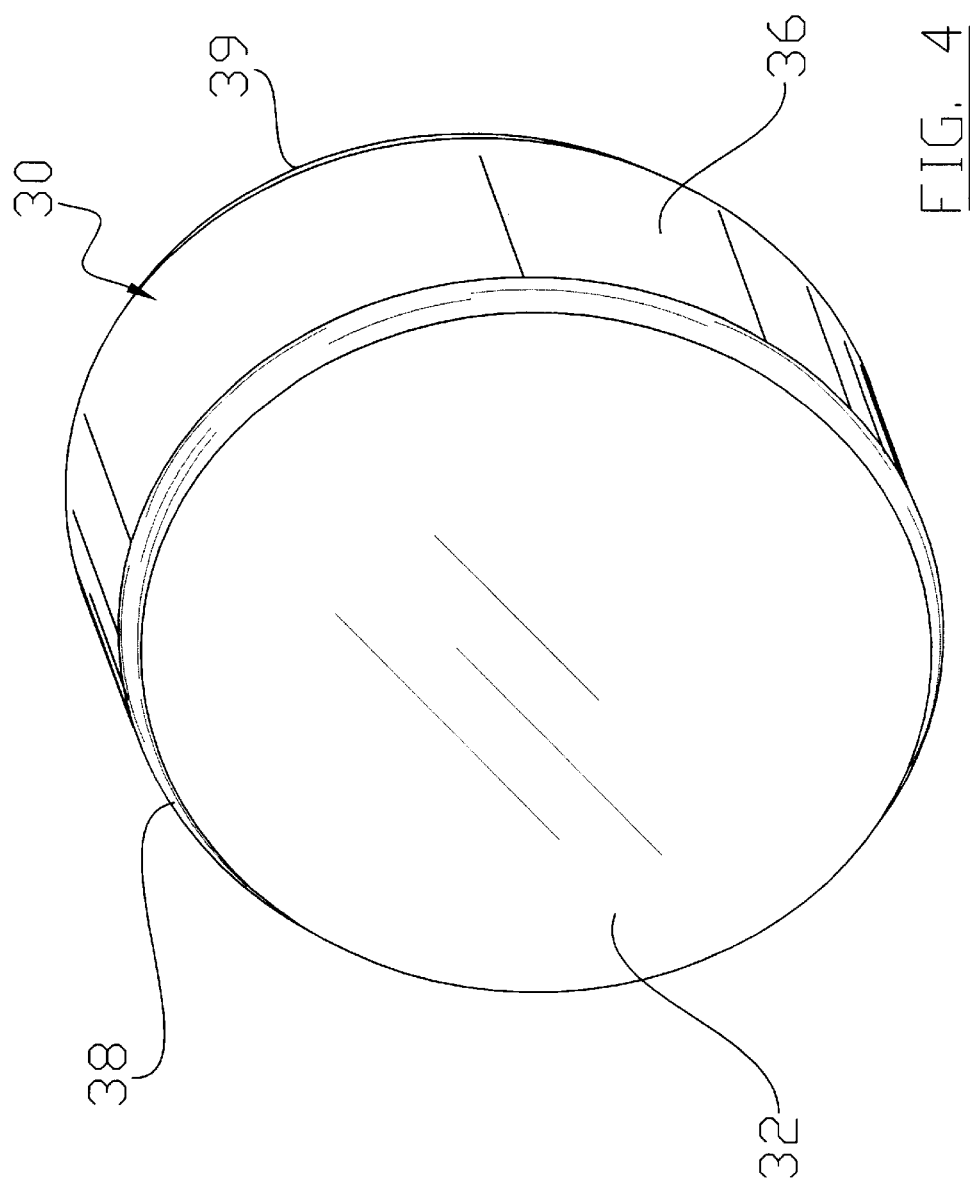
FIG. 4 is an upper perspective view of the removed puck member with the perimeter edges rounded.
Figure 7:
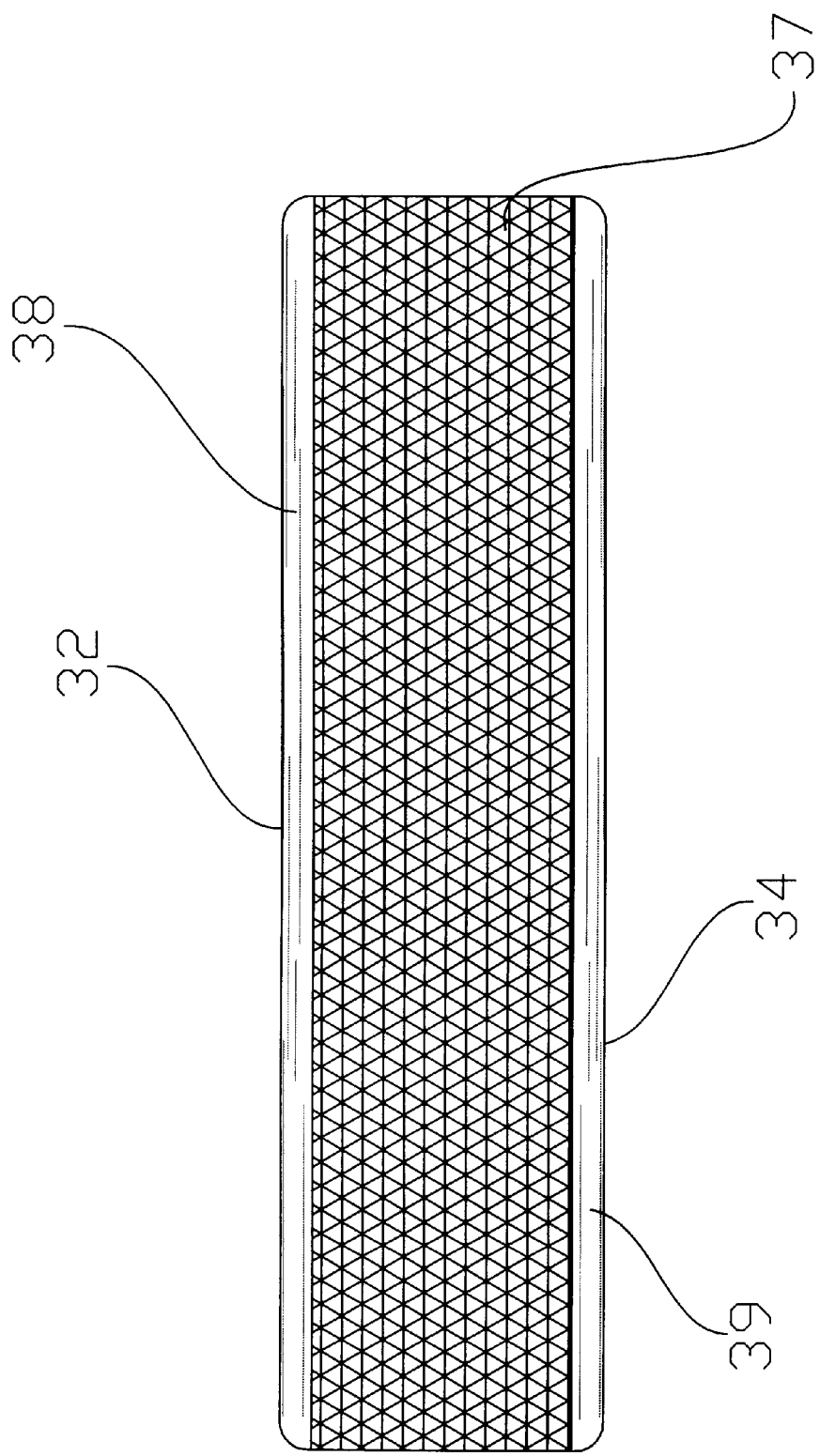
FIG. 7 is a side view of the puck member.
Figure 8:
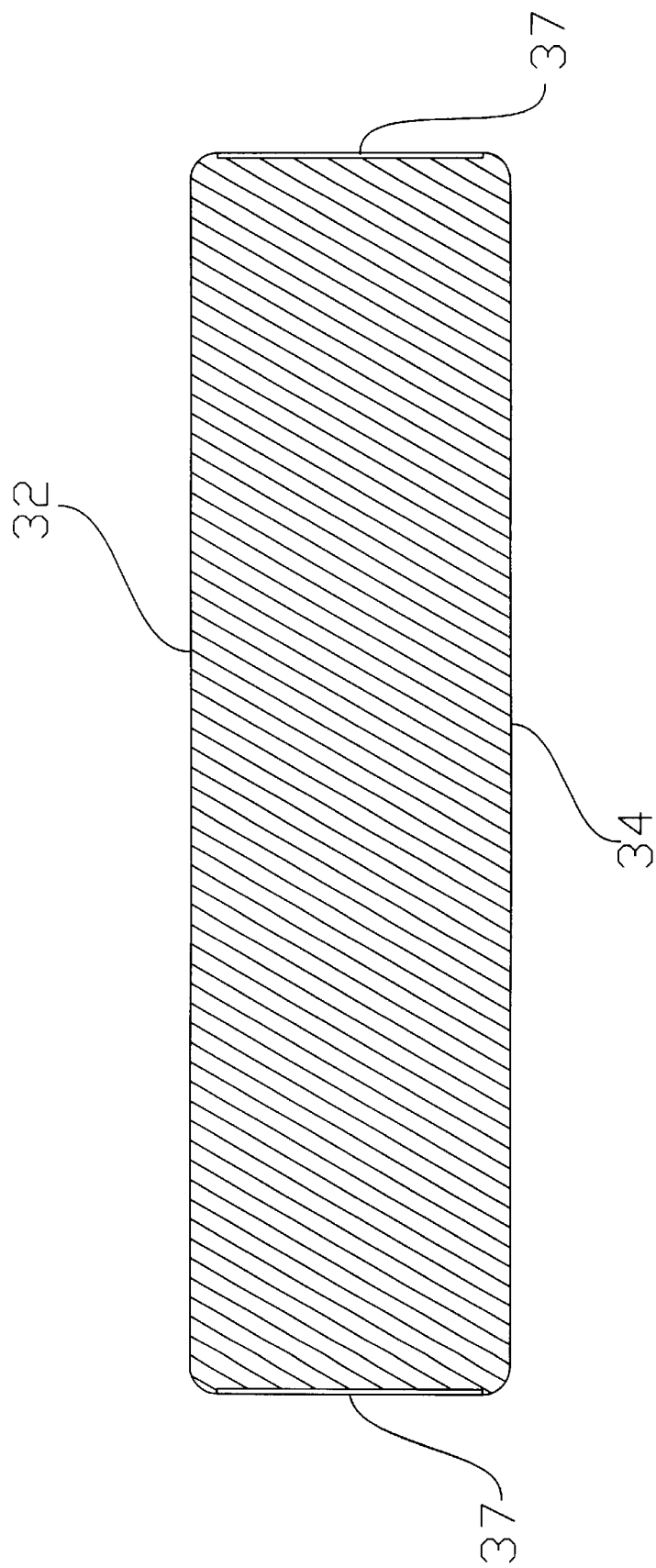
FIG. 8 is a cross sectional view taken along line 8—8 of FIG. 6.

The disk member 30 has a circular shape with a constant thickness as shown in FIG. 3 of the drawings. As shown in FIGS. 4 and 7 of the drawings, the disk member 30 has an outer perimeter surface 36, a first surface 32, and a second surface 34 opposite of the first surface 32. As shown in FIG. 7 of the drawings, the outer perimeter surface 36 is defined as the surface of the disk member 30 between the first surface 32 and the second surface 34. The disk member 30 also has a pair of opposing sharp cornered edges as shown in FIG. 3 of the drawings.

Once the disk member 30 is removed from the metal shaft 20, the user then forms the perimeter edges into an arcuate shape as shown in FIG. 4. The first arcuate edge 38 and the second arcuate edge 39 of the disk member 30 may be formed utilizing conventional metal working tools that are capable of removing metal in an arcuate manner. The radius of curvature for the first arcuate edge 38 and the second arcuate edge 39 may vary, however the radius is preferably sufficient so as to facilitate smooth movement of the disk member 30 upon a surface such as but not limited to ice.

Figure 5:
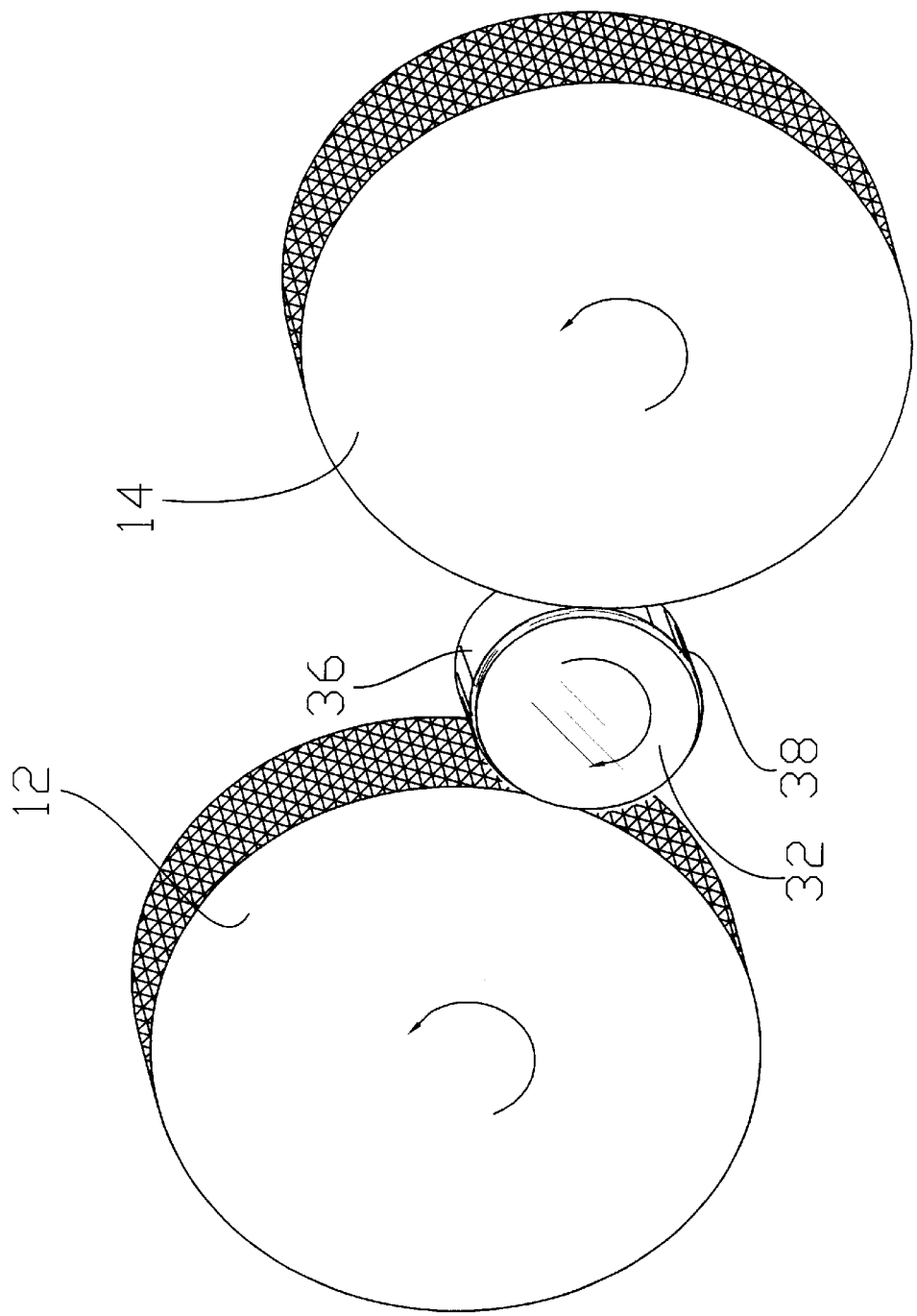
FIG. 5 is an upper perspective view of the removed puck member being rolled between two wheel members that press a gripping into an outer surface of the puck member.
Figure 6:
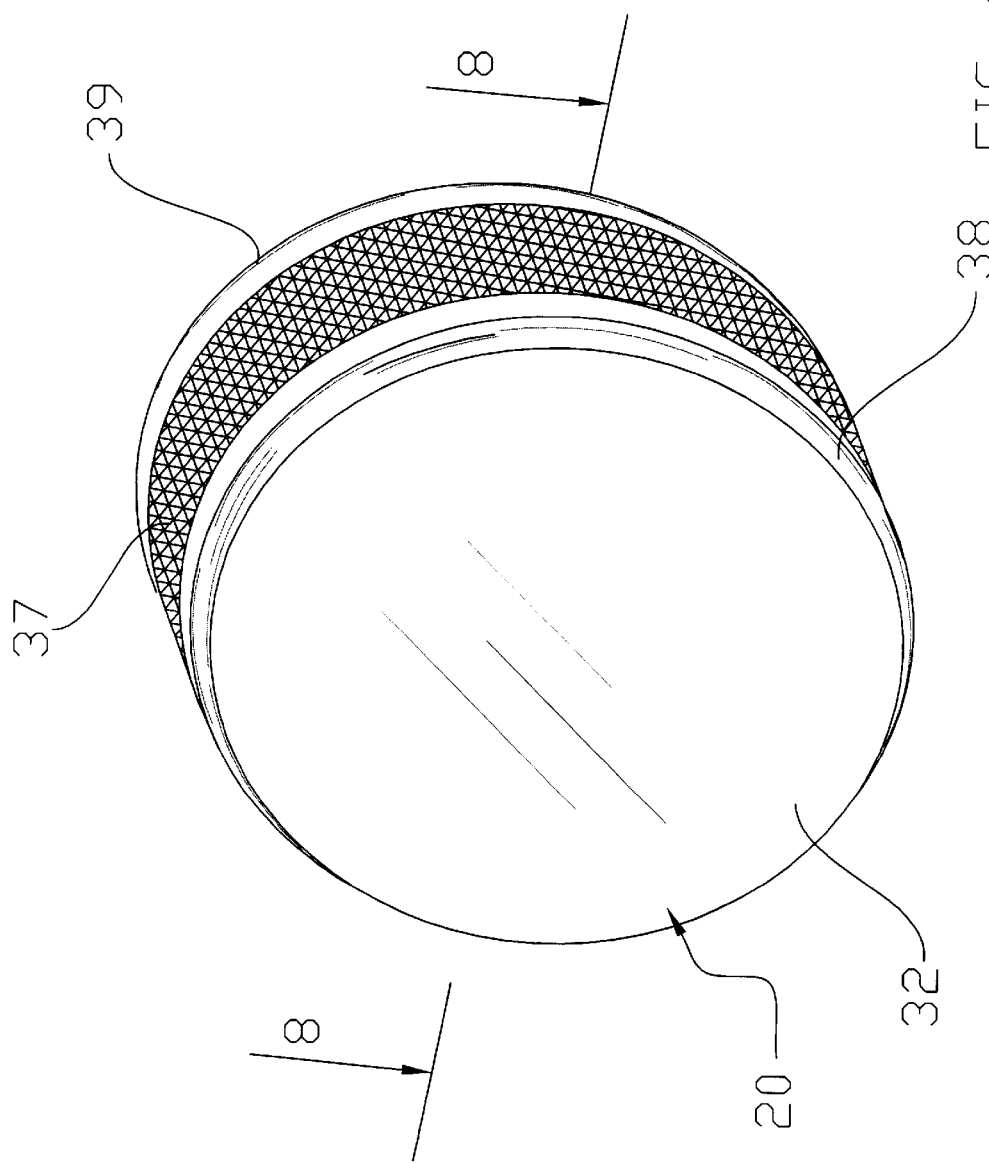
FIG. 6 is an upper perspective view of the puck member.

The user then positions the disk member 30 between a first press wheel 12 and a second press wheel 14 as shown in FIG. 5 of the drawings. The press wheels 12, 14 have a desired knurl pattern that is to be pressed into the outer perimeter surface 36 of the disk member 30. The press wheels 12, 14 rotate in the same direction thereby rotating the disk member 30 in a counter direction as shown in FIG. 5 of the drawings. After the outer perimeter surface 36 is fully encompassed with the knurls 37, the user then removes the disk member 30 from the press wheels 12, 14. It can be appreciated that various other machining methods and tools may be utilized to knurl the outer perimeter surface 36 of the disk member 30. It further can be appreciated that various knurl patterns may be utilized upon the outer perimeter surface 36 in various manners. In addition, the knurls may extend adjacent to the opposing edges 38, 39 as best shown in FIG. 7 of the drawings.

The user then may polish the first surface 32 and the second surface 34 to provide a smooth gliding surface. It can be appreciated that the polishing of the surfaces 32, 34 may occur immediately after severing the disk member 30 from the elongate metal shaft 20.

Figure 9:
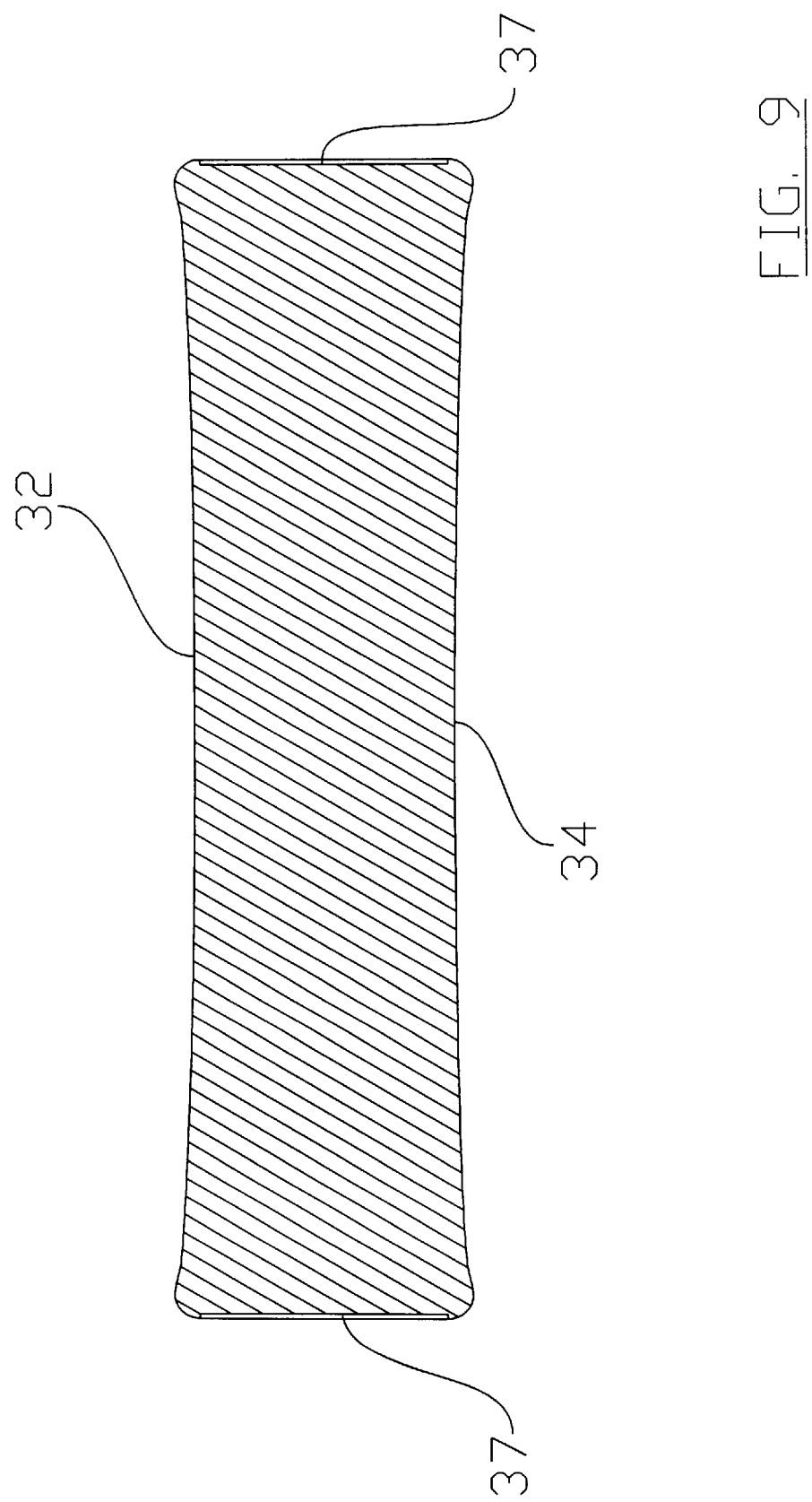
FIG. 9 is a side cutaway view of an alternative embodiment of the puck member with the upper and lower portions partially removed forming cavities within.
Figure 10:
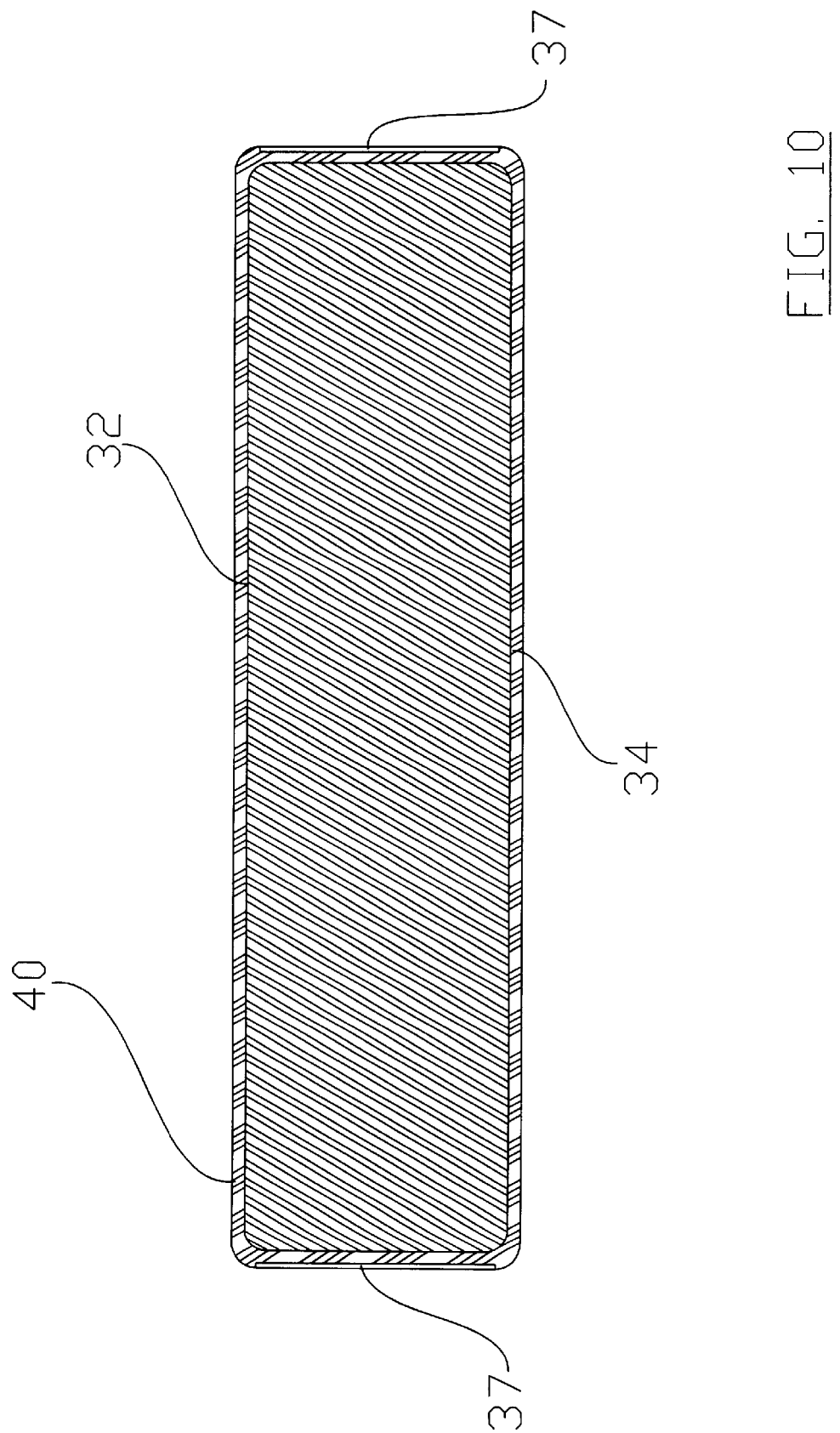
FIG. 10 is a side cutaway view of another alternative embodiment illustrating a coating surrounding the metal puck member.
Figure 11:
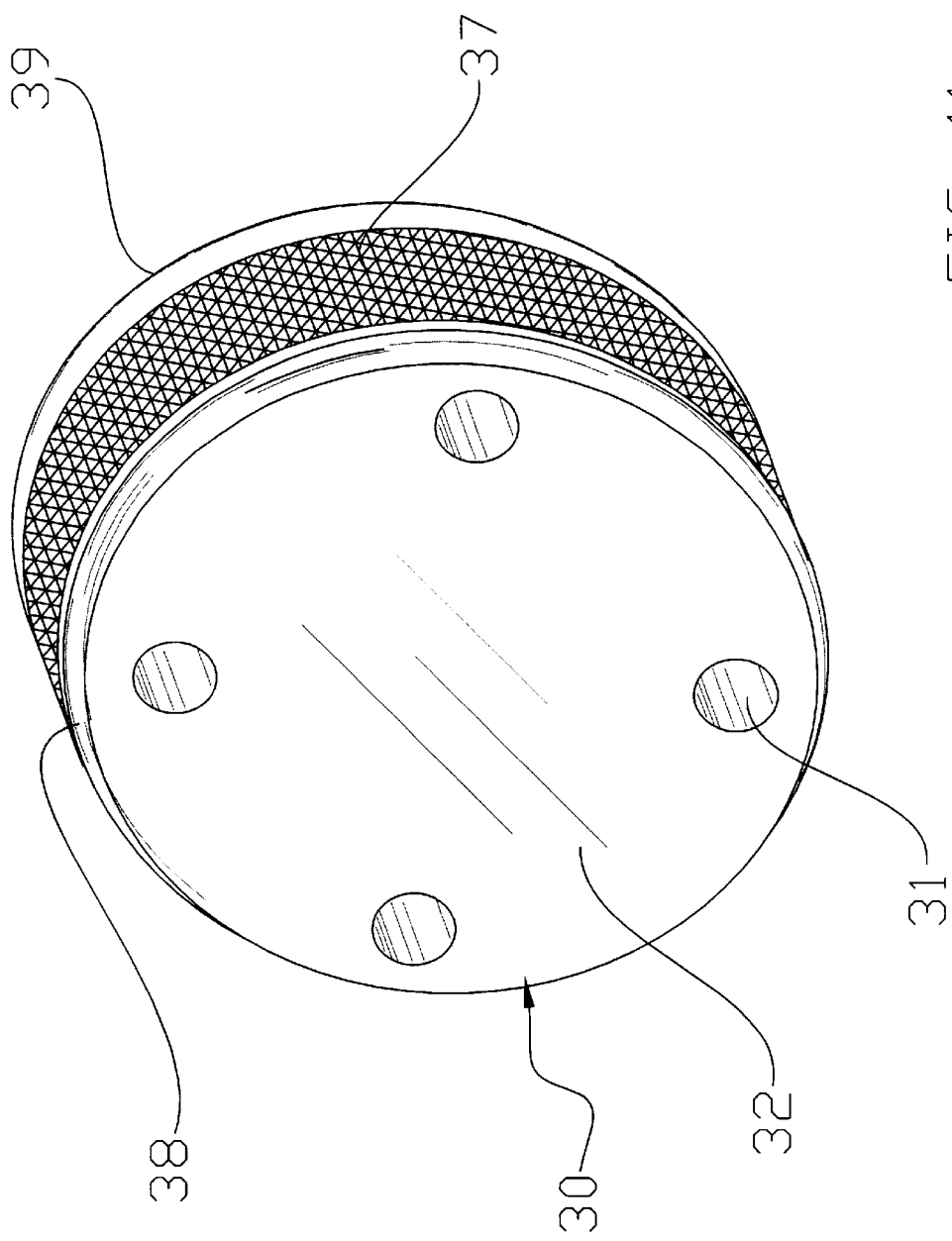
FIG. 11 is an upper perspective view of another alternative embodiment illustrating the usage of apertures within the puck member to adjust the weight of the puck member.

In a first alternative embodiment shown in FIG. 9 of the drawings, the first surface 32 and the second surface 34 have a concave structure for reducing the weight of the disk member 30. In a second alternative embodiment shown in FIG. 11 of the drawings, a plurality of apertures 31 are extended into the disk member 30 for reducing the overall weight of the disk member 30. It can be appreciated that the first and second alternative embodiments may be combined into a single disk member 30.

In a third alternative embodiment of the present invention, a coating 40 is attached to the exterior surface of the disk member 30 for protecting the metal disk member 30 from corrosion and similar deteriorating processes. The coating 40 may be comprised of rubber, plastic or other material capable of bonding to the exterior surface of a metal disk member 30. The coating 40 may also be comprised of paint directly applied to the exterior surface of the disk member 30. The paint may also be bonded within the metal utilizing an anodization process. The third alternative embodiment may also be combined with the first and second alternative embodiments.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of elements for Method Of Manufacturing Hockey Puck |
|---|
| ENVIRONMENTAL ELEMENTS |
| 10. Method Of Manufacturing A Hockey Puck |
| 11. |
| 12. First Press Wheel |
| 13. |
| 14. Second Press Wheel |
| 15. |
| 16. |
| 17. |
| 18. |
| 19. |
| 20. Metal Shaft |
| 21. |
| 22. First End |
| 23. |
| 24. Middle Portion |
| 25. |
| 26. Second End |
| 27. |

| -continued |
|---|
| Index of elements for Method Of Manufacturing Hockey Puck |
| 28. |
| 29. |
| 30. Disk Member |
| 31. Apertures |
| 32. First Surface |
| 33. |
| 34. Second Surface |
| 35. |
| 36. Outer Perimeter Surface |
| 37. Knurls |
| 38. First Arcuate Edge |
| 39. Second Arcuate Edge |
| 40. Coating |
| 41. |
| 42. |
| 43. |
| 44. |
| 45. |
| 46. |
| 47. |
| 48. |
| 49. |
| 50. |
| 51. |
| 52. |
| 53. |
| 54. |
| 55. |
| 56. |
| 57. |
| 58. |
| 59. |
| 60. |
| 61. |
| 62. |
| 63. |
| 64. |
| 65. |
| 66. |
| 67. |
| 68. |
| 69. |
| 70. |
| 71. |
| 72. |
| 73. |
| 74. |
| 75. |
| 76. |
| 77. |
| 78. |
| 79. |

We claim:

1. A method of manufacturing a hockey puck for usage in hockey training sessions, comprising:
    (a) providing an elongate solid metal shaft having a first end, a middle portion and a second end, wherein said elongate metal shaft has a constant diameter D;
    (b) severing said elongate metal shaft in a transverse manner a finite distance from said first end thereby forming a solid single-piece disk member having a flat structure, wherein said disk member includes a first flat surface, a second flat surface opposite of said first flat surface, an outer perimeter surface, and a thickness T, wherein said thickness T is less than said diameter D;
    (c) rounding a first edge and a second edge of said disk member;
    (d) pressing knurls into said outer perimeter surface of said disk member; and
    (e) polishing said first surface and said second surface.

2. The method of manufacturing a hockey puck of claim 1, wherein said elongate metal shaft is comprised of aluminum or steel.

3. The method of manufacturing a hockey puck of claim 1, wherein said disk member weighs between 1 pound to 2 pounds.

4. The method of manufacturing a hockey puck of claim 1, wherein said disk member weighs between 8 ounces to 16 ounces.

5. The method of manufacturing a hockey puck of claim 1, wherein said diameter D is less than three inches.

6. The method of manufacturing a hockey puck of claim 1, wherein said diameter D is between 2 to 2.75 inches.

7. The method of manufacturing a hockey puck of claim 1, wherein said diameter D is greater than 3 inches.

8. The method of manufacturing a hockey puck of claim 1, wherein said thickness T is less than 0.90 inches.

9. The method of manufacturing a hockey puck of claim 1, including the step of creating apertures within said disk member that extend from said first flat surface to said second flat surface in a transverse manner.

10. A method of manufacturing a hockey puck for usage in hockey training sessions, comprising:
   (a) providing an elongate solid metal shaft having a first end, a middle portion and a second end, wherein said elongate metal shaft has a constant diameter D;
   (b) severing said elongate metal shaft in a transverse manner a finite distance from said first end thereby forming a solid single-piece disk member having a flat structure, wherein said disk member includes a first flat surface, a second flat surface opposite of said first flat surface, an outer perimeter surface, and a thickness T, wherein said thickness T is less than said diameter D;
   (c) rounding a first edge and a second edge of said disk member;
   (d) pressing knurls into said outer perimeter surface of said disk member; and applying a coating to an exterior surface of said disk member.

11. A method of manufacturing a hockey puck for usage in hockey training sessions, comprising:
   (a) providing an elongate solid metal shaft having a first end, a middle portion and a second end, wherein said elongate metal shaft has a constant diameter D;
   (b) severing said elongate metal shaft in a transverse manner a finite distance from said first end thereby forming a solid single-piece disk member having a flat structure, wherein said disk member includes a first flat surface, a second flat surface opposite of said first flat surface, an outer perimeter surface, and a thickness T, wherein said thickness T is less than said diameter D; and
   (c) rounding a first edge and a second edge of said disk member.

12. The method of manufacturing a hockey puck of claim 11, wherein said elongate metal shaft is comprised of aluminum or steel.

13. The method of manufacturing a hockey puck of claim 11, wherein said disk member weighs between 1 pound to 2 pounds.

14. The method of manufacturing a hockey puck of claim 11, wherein said disk member weighs between 8 ounces to 16 ounces.

15. The method of manufacturing a hockey puck of claim 11, wherein said diameter D is less than three inches.

16. The method of manufacturing a hockey puck of claim 11, wherein said diameter D is between 2 to 2.75 inches.

17. The method of manufacturing a hockey puck of claim 11, wherein said diameter D is greater than 3 inches.

18. The method of manufacturing a hockey puck of claim 11, wherein said thickness T is less than 0.90 inches.

19. The method of manufacturing a hockey puck of claim 11, including the step of creating apertures within said disk member that extend from said first flat surface to said second flat surface in a transverse manner.

* * * * *